United States Patent
Wadhwa et al.

(10) Patent No.: US 9,771,679 B2
(45) Date of Patent: Sep. 26, 2017

(54) DEVICE FOR GUIDING A FLEX EXTENDING FROM AN APPLIANCE

(71) Applicant: KONINKLIJKE PHILIPS N.V., Eindhoven (NL)

(72) Inventors: Sahil Wadhwa, Eindhoven (NL); Yong Jiang, Eindhoven (NL); Kean Hao Raymond Lee, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 160 days.

(21) Appl. No.: 14/655,219

(22) PCT Filed: Dec. 18, 2013

(86) PCT No.: PCT/IB2013/061091
§ 371 (c)(1),
(2) Date: Jun. 24, 2015

(87) PCT Pub. No.: WO2014/102671
PCT Pub. Date: Jul. 3, 2014

(65) Prior Publication Data
US 2015/0330015 A1 Nov. 19, 2015

Related U.S. Application Data

(60) Provisional application No. 61/745,856, filed on Dec. 26, 2012.

(51) Int. Cl.
*D06F 75/08* (2006.01)
*D06F 79/02* (2006.01)
(Continued)

(52) U.S. Cl.
CPC .............. *D06F 79/02* (2013.01); *D06F 81/00* (2013.01); *H02G 11/003* (2013.01); *H02G 3/32* (2013.01)

(58) Field of Classification Search
CPC ....... D06F 79/00–79/02; D06F 81/00–81/006; H02G 11/003; H02G 3/32
(Continued)

(56) References Cited

U.S. PATENT DOCUMENTS 1,943,136 A * 1/1934 Moser .................. H02G 11/003
24/129 R
2,172,297 A * 9/1939 Snyder ................. H02G 11/003
248/51
(Continued)

FOREIGN PATENT DOCUMENTS

CA 2416078 A1 7/2003
DE 824357 C 12/1951
(Continued)

OTHER PUBLICATIONS

Web/Figure of clamp and cord manager—http://img.amazplus.com/images/l/ebay_image/br04_1.jpg, 2012.
(Continued)

*Primary Examiner* — Sang Y Paik (57) ABSTRACT

A device for guiding a Flex Extending from an Appliance The present application relates to a device 1 for guiding a flex 8 of a garment care appliance that, during use of the appliance 6, hangs downwardly from said appliance. The device comprises a guide tube 4 having a passage therethrough to slideably receive the flex of the garment care appliance, and an attachment part 5 for attachment of the guide tube to a support such that the guide tube is positioned in proximity to, or below, a height at which the appliance is being used. A lower part of the flex that hangs through and below the guide tube maintains an upper part of the flex, extending between the appliance and the guide tube, substantially straight or taut during movement of the appliance towards and away from the device.

10 Claims, 6 Drawing Sheets

(51) Int. Cl.
*D06F 81/00* (2006.01)
*H02G 11/00* (2006.01)
*H02G 3/32* (2006.01)

(58) Field of Classification Search
USPC ................................................ 219/259
See application file for complete search history.

(56) References Cited

U.S. PATENT DOCUMENTS

| | | | |
|---|---|---|---|
| 2,270,997 A | | 1/1942 | Davis |
| 2,510,055 A | | 6/1950 | Aves |
| 2,961,209 A | * | 11/1960 | Willey .................. A01K 97/10 248/515 |
| 3,473,767 A | | 10/1969 | Schwaneke |
| 3,481,570 A | | 12/1969 | Shettel |
| 4,903,929 A | * | 2/1990 | Hoffman ................ B25B 5/003 24/335 |
| 5,727,343 A | | 3/1998 | Wehner |
| 6,263,597 B1 | | 7/2001 | Bric |
| 7,959,121 B1 | * | 6/2011 | Barnes, Jr. ......... A47G 23/0225 224/148.4 |
| 2005/0132761 A1 | | 6/2005 | Carrubba |
| 2010/0102176 A1 | * | 4/2010 | Otinger .................... F16L 3/02 248/75 |

FOREIGN PATENT DOCUMENTS

| | | |
|---|---|---|
| DE | 8329821 U1 | 2/1984 |
| GB | 2291435 A | 1/1995 |

OTHER PUBLICATIONS

Web/Simple little clamp keeps cord organized—http://www.ecoolgadgets.com/simple-clamp-cords-organized/, 2012.
Web/Microphone clamp—http://www.ebay.co.uk/itm/Konig-Universal-Microphone-Clamp-Mic-Holder-Suits-Most-Mics-/251123009448?pt=UK_Sound_Vision_Microphones&hash=item3a781907a8, 2012.

\* cited by examiner

DEVICE FOR GUIDING A FLEX EXTENDING FROM AN APPLIANCE

This application is the U.S. National Phase application under 35 U.S.C. §371 of International Application No. PCT/IB2013/061091, filed on Dec. 18, 2013, which claims the benefit of U.S. Provisional Application No. 61/745,856 filed on Dec. 26, 2012. These applications are hereby incorporated by reference herein.

FIELD OF THE INVENTION

The present invention relates to a device for guiding the movement of a flex or cord extending from a garment care appliance such as an iron. More specifically, it relates to a device for guiding or controlling the movement of a flex hanging from a garment care appliance whilst the appliance is in use.

BACKGROUND OF THE INVENTION

It is common to use an electrical iron for removing creases from garments laid out on an ironing board. In many instances, the iron has an electrical cord with a plug at its free end which is plugged into a domestic electrical mains socket to provide power to the heating element of the iron. The surface of the ironing board on which ironing takes place is normally positioned above the point at which the cord is plugged into the electrical socket and so the cord trails from the iron and freely hangs over the edge of the ironing board down towards the socket.

It is common for the cord to get in the user's way when moving the iron across garments placed on the ironing board. Moreover, as the cord hangs against the edge of the board it often interferes and rubs against garments that are hanging over the edge as the iron is moved backwards and forwards. This movement drags against, and creates wrinkles in, the fabric making the ironing process more difficult and time consuming. It also causes wear to both the fabric and the cord. Furthermore, although movement of the iron across the fabric in a forward direction, i.e. in a direction that pulls the cord up and across the ironing board, draws the cord across a garment lying on the board, the cord may not always drop back on the return stroke of the iron and it may just buckle or flex and lie flat on the ironed fabric or on the board surface. This can be annoying to a user as they have to lift the iron off the board to reposition the cord or to allow it to drop under its own weight back off the surface of the board. It also increases the possibility that inadvertent contact may occur between the cord and the hot soleplate of the iron which may cause irreparable damage and could be dangerous.

Cord guides for irons in the form of a wand or antenna having a loop or opening through which the cord extends above an ironing board are known. These cord guides are all designed to support the cord at an elevated position above the board, thereby substantially preventing all contact of the cord with the ironing board surface. However, although this type of cord guide keeps the cord out of the way of both the board and garments placed upon it, they do not generally allow the cord to slide freely during ironing as the cord must extend upwardly from an iron on the board to the loop or opening in the end of the antenna positioned above it. Therefore, although the cord may slide freely through the loop or opening when the iron is moved across the fabric being ironed in a forward direction away from the antenna, and the cord is pulled through the loop or opening, the weight of the cord hanging down from the antenna may not be sufficient to pull the cord back through the loop or opening when the iron is moved in a direction back towards the antenna. Instead, the cord simply buckles or flexes and lies on the surface of the ironing board. As well as restricting free movement of the cord, the wand or antenna type cord guides are generally bulky and eventually cause wear to the cord due to the relatively high level of friction between the cord and the loop or opening. A typical cord guide of the aforementioned type is known from U.S. Pat. No. 3,473,767.

There are also devices having an antenna to which a cord of an iron is attached so that there is little or no relative movement between the cord and the antenna. Instead, the antenna is made from a resiliently flexible material so that it bends in response to a forward movement of the appliance and as a result of the cord pulling on the antenna, with the aim of keeping the cord relatively straight or taut above the board. However, this works only in a limited area of the board and the fixed length of cord between the iron and the antenna needs readjusting every few minutes. The user also experiences a resistance or backward pull due to the resilience of the antenna which can cause discomfort, especially during prolonged periods of ironing.

In addition to the aforementioned problems, all the antenna type devices are generally bulky and costly.

Another type of garment care device is a so-called handheld steamer, such as those known from US20050132761A1 or CA2416078A1, which is used to remove wrinkles or creases from clothes or fabric in any orientation, such as whilst they are hanging on a support or stand which may or may not be integral with, or form part of, the appliance. CA2416078A1 discloses a device in which the hand-held steamer comprises a housing which is held in the hand and has a nozzle for the ejection of steam from the housing onto garments being steamed. The housing contains a water reservoir, pump and a steam generator/heater. An electrical supply cord extends from the housing to provide power to the appliance. An appliance of this type is generally used to apply steam to garments whilst they are hanging from a support that does not form part of the appliance itself or, for steaming curtains without removing them from the curtain rail from which they are hung. US2005013261A discloses another type of hand-held steamer which includes a base unit. A flexible hose extends from the base unit to a hand-held housing having a nozzle for the ejection of steam. Another device is known in which the housing comprises a steam generator/heater, but the reservoir is contained within the base and a flexible tube supplies water to the steam generator in the housing. Alternatively, both the reservoir and the steam generator/heater may be mounted in the base, in which case, steam is supplied to the housing via the flexible tube. The housing may also include a suction fan to suck steam into the housing and return condensate back into the reservoir in the base via a flexible tube.

With the hand-held steamers of the type described above, the housing is generally moved upwardly and downwardly rather than from side-to-side, as with a conventional iron when used together with an ironing board. However, even with this type of device, the flex or tube hanging down from the appliance can get in the way.

SUMMARY OF THE INVENTION

It is an object of the invention to provide a device for guiding the movement of a flex of a garment care appliance that substantially alleviates or overcomes the problems mentioned above and which controls and manages movement of the flex more effectively than conventional guides.

According to the invention, there is provided a device for guiding a flex of a handheld garment care appliance that, during use of the appliance, hangs downwardly from said appliance, the device comprising a guide tube having a passage therethrough to slideably receive the flex of the garment care appliance, and an attachment part for attachment of the guide tube to a support such that the guide tube is positioned in proximity to, or below, a height at which the appliance is being used, the arrangement being such that a lower part of the flex hanging through and below the guide tube maintains an upper part of the flex, extending between the appliance and the guide tube, substantially straight or taut during movement of the appliance towards and away from the device. The guide of the device of the invention controls and guides movement of the flex or cord, and prevents it from causing an obstruction or rubbing against a support, a garment being treated, or the user of the appliance.

Ideally, the cord or flex extending through the passage of the guide tube can move freely through it in either direction. If the garment care appliance is an iron and the device is attached to an ironing board, a flex extending through the guide tube is allowed to move freely in a direction extending substantially at right angles to a surface on which ironing is carried out. The flex extends downwardly through the guide tube so that the weight of the flex that hangs freely beneath the guide tube pulls on the portion of the flex between the guide and the appliance, thereby keeping it straight or taut and keeping the flex clear of the edge or surface along which the appliance is moved. The portion of the flex below the guide thus lengthens or shortens corresponding to movement of the appliance towards or away from the guide. The flex extends into the guide tube from the appliance through an upper end of the guide tube. Preferably, the upper opening of the guide tube is level or only extends to a limited extent above the ironing surface but below the point of attachment of flex to the appliance. A preferred height of the upper end of the guide tube is between 5 and 50 mm, to maintain the flex clear of the edge of the board or surface across which the appliance moves.

In some preferred embodiments, the guide tube may be pivotally attached to the attachment part so that it can swivel relative to the attachment part. When a user moves the iron forwards, i.e. in a direction away from the guide tube, the moment of the resulting frictional force between the guide tube and the flex about the pivot may be greater than the moment of the weight of the hanging portion of the flex between the guide tube and the supply outlet. This results in the guide tube rotating about the pivot until it reaches an instantaneous equilibrium position with respect to the particular position of the iron and the weight of the flex hanging downwards between the guide tube and the supply outlet. Hence, the rotation of the guide tube allows the flex to follow its most natural path through the guide tube, thereby minimising the friction between the flex and the guide tube, which in turn keeps the portion of the flex between the iron and the guide tube substantially taut. This tension is responsible for allowing the flex to fall back through the guide tube on the return stroke of the appliance, i.e. when the appliance is moved in a direction towards the guide tube, instead of coiling up or kinking and remaining on the surface of the ironing board or on the garment being ironed. The total length of the passage through the guide tube is preferably greater than 5 mm but less than 150 mm, depending on the properties of the flex, such as its flexibility. Hence, by making the guide tube pivotally attached to the attachment part, the guidance provided to the flex is even more enhanced and improved and the friction between the guide tube and the flex is reduced.

In a preferred embodiment, the guide tube is of a substantially cylindrical construction. It may also have a slot extending along its length to enable insertion of a flex into the opening through the slot.

The guide tube may be formed from a resiliently deformable material to facilitate the insertion of a flex into the guide tube through the slot.

The opening in the guide tube may be flared outwardly at one or both ends. This enables the flex to follow a large radius of curvature whilst sliding through the guide tube, instead of bending sharply as it enters the guide tube.

In some preferred embodiments, the attachment part comprises a releasable clamp. The clamp may have a spring biased lever.

The releasable clamp may comprise an upper portion and a lower lever portion pivotally mounted to the upper portion about a pivot pin. A torsion spring may then be mounted to the pivot pin to bias the lower lever portion in a direction towards the upper portion. This enables the device to be quickly and easily attached to, and removed from, a support using one hand.

If the garment care appliance is an iron and the support is an ironing board, the attachment part can be attachable to an edge of said ironing board so that the guide tube extends substantially across said edge. This isolates and spaces the flex from the edge of the ironing board and prevents it from sliding laterally along the edge of the board and/or against any garment hanging over the edge of the board.

In some embodiments, the device may include a slide rail attachable to an ironing board edge adjacent to a surface on which garments are to be ironed, and so that the guide tube cooperates with said slide rail to allow movement of the guide tube in a lateral direction along said edge. The slide rail may be pivotally attached to the edge of an ironing board so that it is rotatable between an operative position and a stowed position.

If the garment care appliance is a hand-held steamer and the support is an upright pole on which a garment to be steamed is hung, the attachment part of the device may then be configured so that the attachment part is attachable to said upright pole. The device may then also be modified so that it is rotatable around a longitudinal axis of the pole.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which:

FIG. 4b illustrates a side elevation of the device shown in FIG. 4a;

FIG. 5b illustrates a side elevation of the device shown in FIG. 5a;

DETAILED DESCRIPTION OF THE EMBODIMENTS

Some embodiments of the invention provide a device that prevents the electrical cord of an iron from contacting the edge of an ironing board. Some embodiments also prevent the cord from moving laterally along the edge of an ironing board during ironing, but otherwise allow the cord to move freely so that as the iron is moved away from the device across a garment being ironed, the proportion of the length of the cord which is above the edge of the ironing board passes through the device and increases. Similarly, when the iron is moved in the opposite direction, towards the device, the cord slides back through it so that the proportion of the cord that is below the edge of the ironing board increases. As the cord is prevented from contacting the edge of the board, it does not rub against any garments hanging over the edge. Furthermore, as the device projects above the ironing board surface to only a very limited extent, the cord is guided downwardly from the iron into and through the cord guide tube, so that it slides with minimal friction, thereby preventing it from flexing or buckling and remaining on the board surface when the iron is moved back towards it.

The device of the invention may also be used to provide some guidance and/or control over a cord extending from a hand-held steaming appliance that is used to steam garments whilst they are hanging from a support. In embodiments of the invention in which the device is used with an appliance of this type, the device can be attached to a support, such as the stand on which the garments have been hung for steaming. The cord extending from the appliance then hangs downwardly through the device which controls and constrains its movement whilst allowing it to slide freely in an upward and downward direction as the appliance is being moved to apply steam to the garment.

Although reference is made to a flex or cord, it will be appreciated that the device may be used to control the movement of a flexible tube and is not limited specifically to electrical cords. For example, many irons and hand-held steamers have tubes for the passage of steam or water from a base part to a hand-held part. It will therefore be appreciated that the device may be used to control and/or guide movement of this tube in addition to, or alternatively to a power cord. Therefore, although the term "flex" is used in the claims, this should be taken to include within its scope, flexible tubes or conduits for the passage of steam or water as well as, or in addition to, power cords, leads or a flex.

Figure 1:
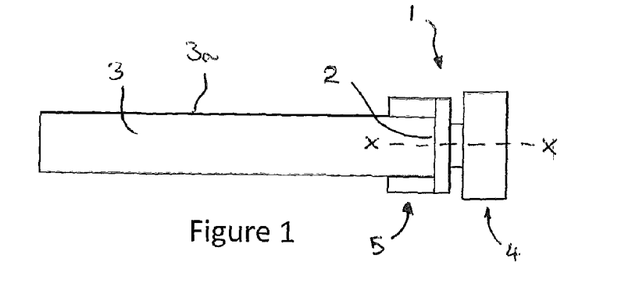
FIG. 1 illustrates a schematic side elevation of the device attached to an edge of an ironing board.

A schematic side elevation of the device 1, attached to an edge 2 of an ironing board 3 is shown in FIG. 1. The device 1 is formed of two main parts namely, a guide tube 4 which, as shown, transverses the edge 2 of the ironing board 3 and, an attachment part 5, which releasably attaches the guide tube 4 to the ironing board edge 2. Although the guide tube 4 and attachment part 5 may be rigidly attached to each other or even integrally formed, it is preferable that they are formed separately and attached to each other so that the guide tube 4 can pivot relative to the attachment part 5 about an axis X-X extending between the guide tube 4 and the attachment part 5 so that the guide tube 4 can orientate itself dynamically according to the position of an iron and the direction in which a cord is being pulled as the iron is moved across a surface 3a of the ironing board 3.

Figure 2:
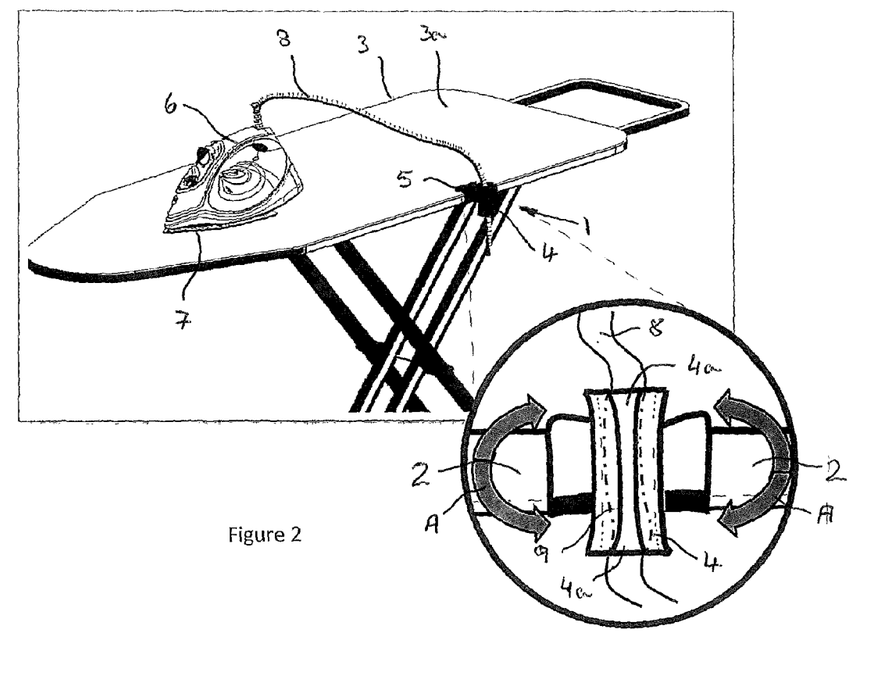
FIG. 2 illustrates the positioning of the device on the edge of an ironing board more clearly and shows how the cord extends through it from an iron located on the surface of the ironing board.

FIG. 2 shows in more detail the position of the device 1 on the edge 2 of the ironing board 3 and a magnified view of the edge 2 of the ironing board 3 and device 1. It also shows an iron 6 having its soleplate 7 positioned flat on the ironing board surface 3a and with its cord 8 extending from the iron 6 and over the edge of the ironing board 3 through an opening 4a extending through the guide tube 4, which can rotate relative to its attachment part 5 in the directions shown by the arrows "A" as the iron 6 is moved across the surface 3a of the ironing board 3. FIG. 2 clearly shows that the guide tube 4 projects only a short distance above the board surface 3a, which means that the cord 8 extends in a downward direction from the iron 6, when in its ironing position as shown, towards and down through the guide tube 4. This arrangement reduces the friction of the cord 8 against the guide tube 4, which results in the cord 8 sliding through the guide tube 4 more freely when the iron is moved in any direction across the board surface 3a. The weight of the cord 8 dangling from the lower end of the guide tube 4 below the surface 3a of the board 3 assists movement of the cord 8 back through the guide tube 4 when the iron 6 is moved in a direction towards the device 1. The cord 8 may extend downwardly all the way to the floor or to a socket, such as a mains supply socket. The mains supply socket may be positioned at a level which is below the guide tube 4 so that the cord 8 hangs downwardly from the guide tube 4. Alternatively, even if the supply socket is at the same level or above the guide tube 4, the cord will still hang downwardly from the end of the guide tube before extending or looping upwardly towards the mains supply socket, the arrangement always being such that the length of the cord hanging downwardly from the end of the guide tube 4 is sufficient to pull on the cord extending from the appliance to the upper end of the guide tube 4, so as to keep this part of the cord substantially taut or straight so that it always extends directly from the appliance to the guide tube 4 without any kinks or loops in it.

FIG. 2 also shows that the guide tube 4 is provided with a slot 9 extending along its length. A cord 8 may be pushed through the slot 9 into the opening 4a. Preferably, the width of the slot 9 is at least slightly less than the width of the cord 8 so that a degree of force must be applied to the cord 8 to push it through the slot 9 and into the opening 4a. Although it is envisaged that the guide tube 4 will be made from a resiliently flexible material so that it will deform slightly when the cord 8 is pressed against the slot 9 to open the slot 9 and allow the cord 8 to pass into the opening 4a before regaining its original shape and capturing the cord 8 within the guide tube 4, it is also possible to rely on the flexibility of the cord 8 itself and its tendency to flatten as it is pushed against the slot 9, thereby enabling it to pass through the slot 9 and into the opening 4a. Although the slot 9 is shown as extending in a direction parallel to a longitudinal axis of the guide tube 4, it is also envisaged that the slot 9 could extend circumferentially or helically part way around the guide tube 4, as this would also prevent the cord 8 from escaping from the opening 4a through the slot 9. The slot effectively acts as a kind of latch to secure the cord within the opening 4a whilst still enabling it to be removed easily by a user once they have finished ironing. In other unillustrated embodiments, the slot may include a hinged door or cover which allows the insertion of the cord when open and retains it inside the passage of the guide tube 4 when the cover is closed.

The opening 4a may be generally cylindrical in shape to match the shape of a cord or flex extending therethrough. It will also have a diameter greater than the cord 8 to be received within it so that the cord 8 can slide freely within the opening 4a. The opening 4a may also be flared outwardly towards at least one of its upper and lower ends to provide a larger radius of curvature to the cord 8 as it passes through the guide tube 4, further increasing the mobility of the cord 8 through the opening 4a.

Figure 3:
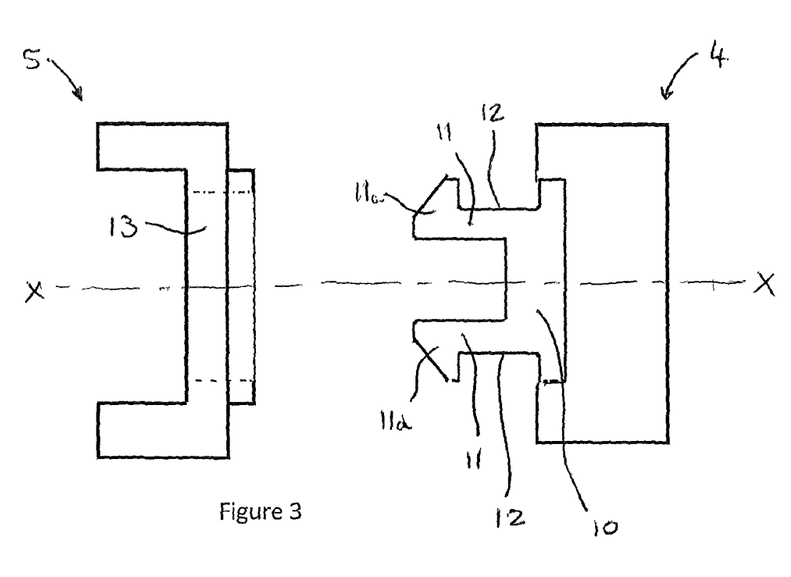
FIG. 3 illustrates an embodiment in which the cord guide tube and the attachment part are formed from two different components so that they can rotate relative to each other about an axis.

FIG. 3 illustrates a schematic side view of one embodiment to show how the guide tube 4 and the attachment part 5 may be connected to each other so as to allow pivotal movement between them about axis X-X, although numerous other forms of pivotal connection are also envisaged. In the illustrated embodiment of FIG. 3, the guide tube 4 is provided with a connector portion 10 that may be integrally formed or molded with the guide tube 4 or otherwise rigidly attached to it. The connector portion 10 extends laterally away from the guide tube 4 from a point midway between the ends of the guide tube 4. The connector portion 10 has resiliently deformable tangs 11 with a head portion 11a and a seat 12. The attachment part 5 has a hole 13 which is shaped and sized so that the tangs 11 deform inwardly due to contact between the head portion 11a and the edge of the hole 13 as they are pushed through the hole 13. Once the head portion 11a has cleared the hole 13, the tangs 11 are free to snap outwardly to connect the guide tube 4 to the attachment part 5. The seat 12 has a diameter which is less than the diameter of the hole 13 in the attachment part 5 so that the connector portion 10 can rotate in the hole 13 about axis X-X. In other unillustrated embodiments, the attachment part and the guide tube 4 may be coupled to each other using a screw that allows pivotal movement between the attachment part and the guide tube 4.

The attachment part 5 can take many different forms. Its main requirements are that it is capable of attaching the guide tube 4 securely and firmly to the edge 2 of an ironing board 3, support stand, or some other means of support. If it is to attach to the edge 2 of an ironing board 3, then it may be capable of attaching to the edge of the surface on which ironing is carried out, the edge of a tray on which the iron is placed or some other part of the ironing board along or protruding from its edge. It should therefore be easily adaptable to different ironing boards so that, for example, it can fit ironing boards 3 of different thicknesses without causing any damage to the board 3 or any ironing board cover attached thereto. Preferably, the attachment part 5 is completely independent of the ironing board 3 so that it may not only be used with any ironing board 3, but also so that it can be positioned by the user at any preferred location around the edge 2 of the ironing board 3 and detached easily and quickly when it is not required. The attachment part 5 may include spring loaded levers, magnets, thumb screw based G-clamps, flexible material with shapes that grip due to bending stresses, hook and loop fasteners, etc.

A preferred form of attachment part 5 takes the form of a spring-loaded lever, as will now be described with reference to FIGS. 4a and 4b. The attachment part 5, which is pivotally attached to the guide tube 4, comprises an upper plate 14 and a lower plate 15 mounted to the upper plate 14 for rotation about an axis B-B. A torsion spring 16 normally urges the upper and lower plates 14, 15 tightly closed together to clamp anything positioned between them. To use the device, the user rotates the lower plate 15 away from the upper plate 14 against the torsion applied by the spring 16 (i.e. in the direction indicated by arrow C and positions the device with the edge 2 of an ironing board 3 between the upper and lower plates 14, 15. When the lower plate 15 is released, it springs back towards the upper plate 14 to grip the edge 2 of the ironing board 3 between the upper and lower plates 14, 15. The strength of the torsion spring 16 is selected so that the device will remain in place even during vigorous ironing but also so that it may be easily removed altogether from the edge 2 of an ironing board 3 and/or repositioned as required by the user during ironing.

Figure 4A:
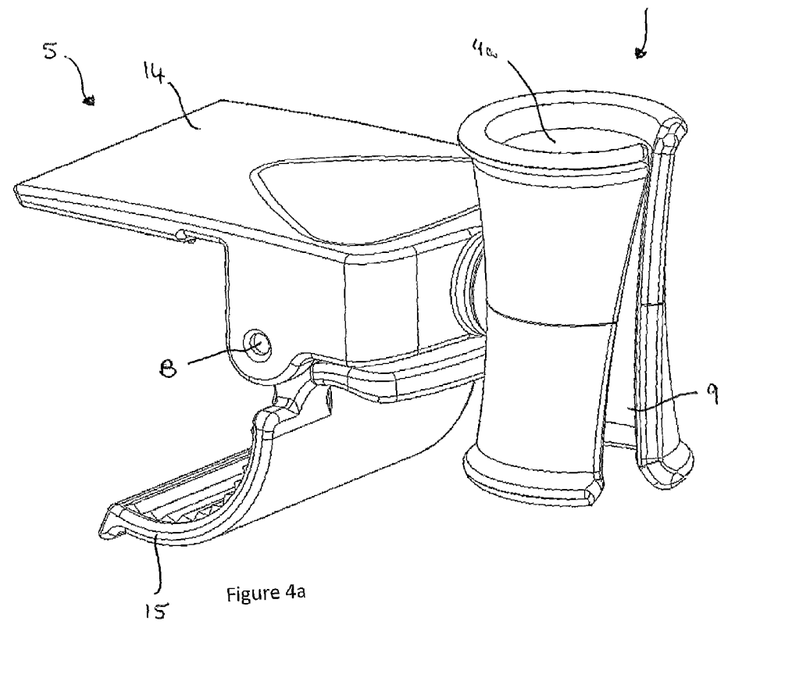
FIG. 4*a* illustrates a perspective view of one embodiment of a device that includes a spring driven clamping lever and shows the guide tube having a slot through which a flex may be pushed into the passage in the guide tube.
Figure 4B:
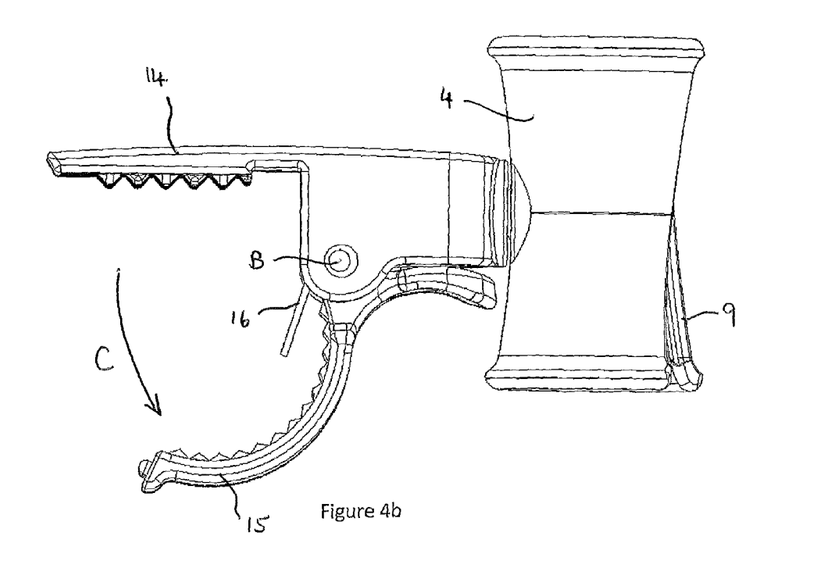
Figure 5A:
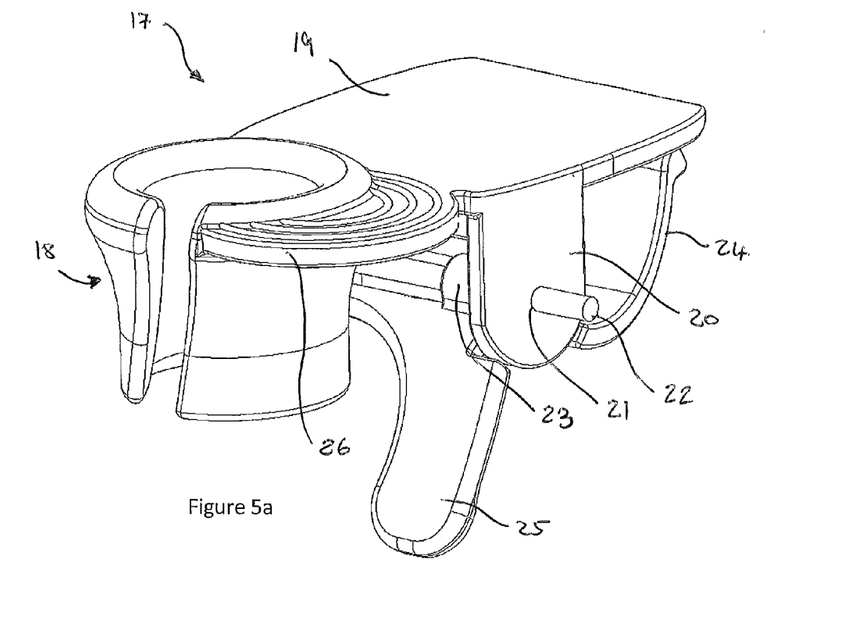
FIG. 5a illustrates a perspective view of another embodiment of a device that includes a spring driven clamping lever.
Figure 5B:
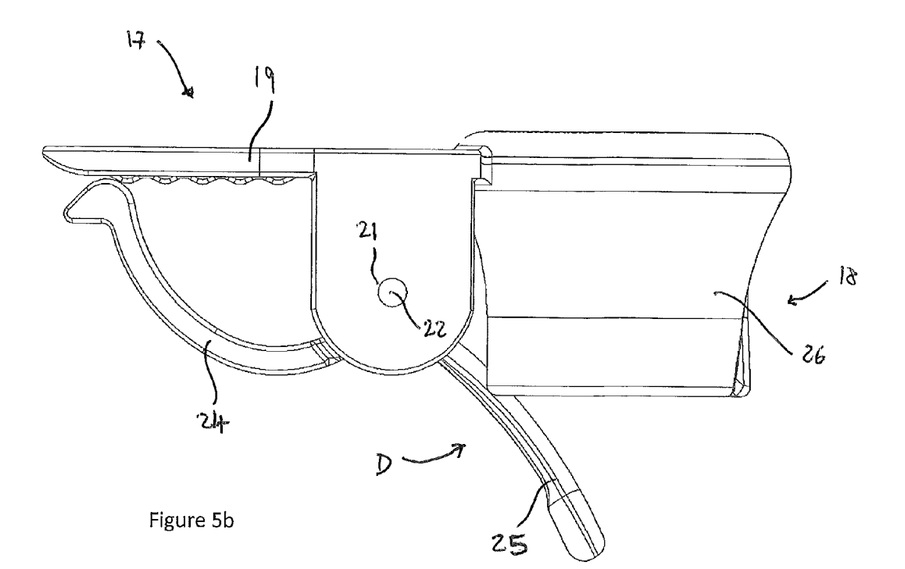

An alternative embodiment is shown in FIGS. 5a and 5b. This embodiment is similar to the embodiment of FIGS. 4a and 4b, except that the guide tube 4 is formed integrally with the upper plate 14 and so represents a slight compromise on the functionality of the previous embodiment, as the guide tube 4 cannot pivot relative to the attachment part. However, this embodiment has fewer parts and lower manufacturing costs as well as potentially having increased robustness, whilst still addressing the cord management problems identified above.

As shown in FIGS. 5a and 5b, the device 17 comprises an integrally formed body comprising a guide portion 18 and upper clamping arm 19. A pair of wings 20 extend from the opposite edges of the upper clamping arm 19 and have an aligned hole 21 through each of them to receive an axle 22 that also extends through a lug 23 formed integrally with a lower clamping arm 24. A torsion spring (not shown) is provided to control movement of the lower clamping arm 24 relative to the upper clamping arm 19, as with the embodiment of FIGS. 4a and 4b. The lower clamping arm 24 has an extension part 25 and an upper end of the guide portion 18 has a web 26. A user may place a thumb on the web 26 and one or more fingers on the extension part 25 and squeeze or pinch to pivot the lower clamping arm 25 from its closed position towards its open position (in the direction of arrow D in FIG. 5b), thereby making it easier to manipulate and attach and/or remove the device 17 from the edge 2 of an ironing board 3. A similar web and extension part may also be provided to the embodiment of FIGS. 4a and 4b to enable the user to use a pinching movement to open the clamp.

A further embodiment will now be described with reference to FIGS. 6, 7a and 7b. In this embodiment, the attachment part 5 has been replaced with a slide rail 30 which is attached along the edge 2 of an ironing board 3. The guide tube 31 has a roller 32 which is slideably received in the slide rail 30 so that, in addition to being able to rotate, the guide tube 31 can now also slide laterally along the edge 2 of the ironing board within the slide rail 30 (in the direction of arrow "E" in FIG. 6). The rail 30 has a smooth surface to reduce friction with the roller 32 so that the guide tube 31 will slide freely along the slide rail 30.

Although the slide rail 30 may be attached to the ironing board edge using screws or some other conventional means, it is also envisaged that it could be hinged to the edge 2 of the board 3 so that it may pivot downwardly to a stowed position beneath the ironing board 3 when not in use. FIG. 7a shows the slide rail attached to the edge 2 of an ironing board 3 in an operative position, whereas FIG. 7b shows the slide rail after it has been pivoted about hinge 33 into its stowed position underneath the ironing board 3. The slide rail 30 may be provided with a catch to retain it in its operative position. For example it may be held in place using magnets.

Figure 6:
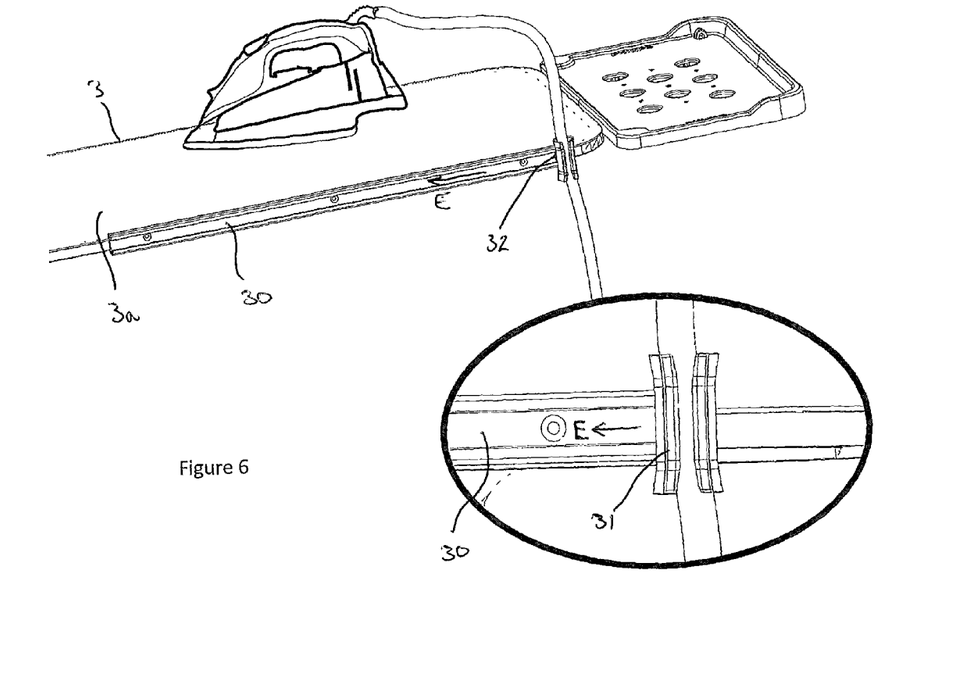
FIG. 6 illustrates another embodiment that includes a slide rail attachable to the edge of an ironing board.
Figure 7:
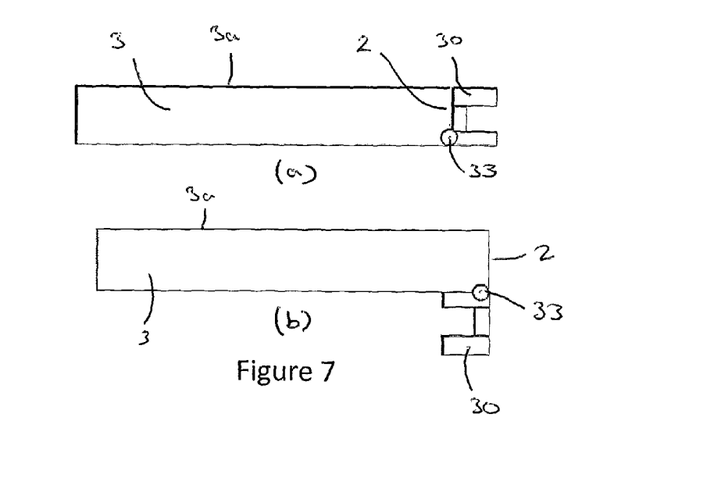
FIG. 7a illustrates a schematic view of the edge of an ironing board with a slide rail attached thereto in an operational position.
FIG. 7b illustrates the edge of an ironing board as shown in FIG. 7a, but with the slide rail shown in its stowed position.

The embodiment of FIGS. 6 and 7 further enhances the flexibility of the cord, as the guide tube 31 can now translate along the edge of the ironing board 3 as well as rotate about an axis extending substantially at right-angles to the direction of movement of the cord through the guide tube 31.

Embodiments of the invention are applicable to all different types of ironing board, irrespective of whether the board is made from wood or metal.

Figure 8A:
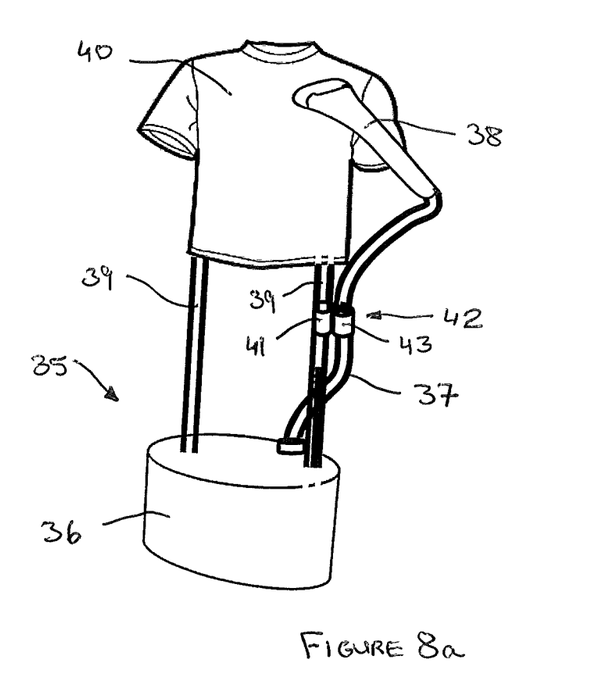
FIG. 8a shows a device according to an embodiment of the invention attached to an upright of a garment support stand forming part of a hand-held steaming appliance.

If the device is to be attached to a support stand, such as a stand used for hanging clothes whilst being steamed using a hand-held steamer, the device may take a similar form to that shown in FIG. 4 or 5, although the longitudinal axis of the passage will extend at 90 degrees to the upper and lower clamping arms, as it will clamp to a vertically orientated support. It is also envisaged that the device may pivot about the support stand. If, for example, the support stand is a vertical upright, then the device may be able to pivot in a circumferential direction around the upright. A hand-held steaming appliance 35 is shown in FIG. 8a and comprises a base 36 containing a steam generating assembly (not shown). A flexible hose 37 extends from the base 36 to a hand-held nozzle 38 at its free end. Uprights 39 extend from the base 36 upon which a garment 40 to be steamed may be hung. In this embodiment, the attachment member 41 of the device 42 of the invention is attached to one of the uprights 39 and the hose 37 passes through the guide member 43. When the nozzle 38 is passed over a garment 40 supported on the appliance 35, the hose 37 slides in a vertical direction through the guide member 43 and keeps it neatly out of the way of the user. This flexible hose 37 may carry water or steam depending on the architecture of the steamer, or it may be an electrical cord, or a combination thereof.

Figure 8B:
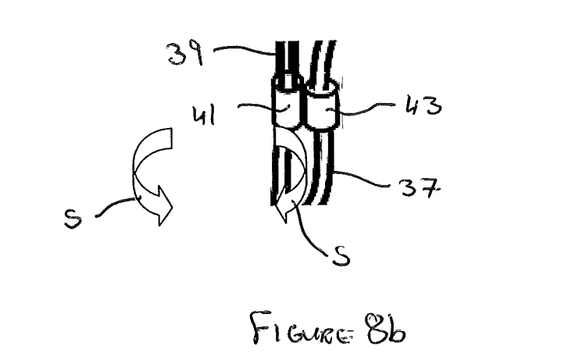
FIG. 8b shows an enlarged view of a portion of the upright shown in FIG. 8a to which the device is attached.

FIG. 8b shows an enlarged view of the portion of the upright 39 to which the device 42 is attached. The attachment member 41 may be configured so that it can swivel around the axis of the upright 39 to which it is attached, as indicated by arrows "S" in FIG. 8b. Alternatively, the attachment member 41 may remain in a fixed position relative to the upright 39 and the guide member 43 may be mounted to the attachment member 41 so that the guide member 43 moves relative to the attachment member 41 in a direction around the upright 39.

It will be appreciated that the term "comprising" does not exclude other elements or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A device for guiding a flex of a handheld garment care appliance the device comprising:
    a guide tube constructed of a resiliently flexible material having a slot extending along its length to slideably receive the flex of the appliance, and
    an attachment part configured and arranged to attach the guide tube to an edge of an ironing board such that the guide tube is positioned in proximity to, or below, a height at which the appliance is being used, the arrangement being such that a lower part of the flex hanging through and below the guide tube maintains an upper part of the flex, extending between the appliance and the guide tube, substantially straight and taut during movement of the appliance towards and away from the device,
    wherein the attachment part and the guide tube are arranged and configured such that, when the attachment part is attached to an edge of an ironing board in an ironing position, the guide tube extends across said edge from a position located above an upper surface of the appliance to a position located below the upper surface,
    wherein the flex extends into the guide tube from the appliance through an upper end of the guide top,
    wherein an upper opening of the guide tube is level or otherwise extends a limited extent above the ironing surface but below the point of attachment of flex to the appliance
    wherein said guide tube is mounted to the attachment part for rotation about an axis parallel to the upper surface of the ironing board thereby minimising the friction between the flex and the guide tube which further maintains said upper part of the flex, extending between the appliance and the guide tube, substantially straight and taut allowing the flex to fall back through the guide tube on a return stroke of the appliance.

2. A device according to claim 1, wherein the guide tube has a substantially cylindrical opening extending therethrough to slideably receive a flex.

3. A device according to claim 2, wherein the guide tube has a slot extending along its length to enable insertion of a flex into the guide tube through the slot.

4. A device according to claim 3, wherein the guide tube is formed from a resiliently deformable material to facilitate the insertion of a flex into the guide tube through the slot.

5. A device according to claim 2, wherein the substantially cylindrical opening is flared outwardly at one or both ends.

6. A device according to claim 1, wherein the attachment part comprises a releasable clamp.

7. A device according to claim 6, wherein the releasable clamp comprises a spring biased lever that comprises an upper portion and a lower lever portion pivotally mounted to the upper portion about a pivot pin, a torsion spring being mounted to the pivot pin to bias the lower lever portion in a direction towards the upper portion.

8. A device according to claim 1, wherein the attachment part includes a slide rail attachable to an ironing board edge adjacent to a surface on which garments are to be ironed and the guide tube cooperates with said slide rail to allow movement of the guide tube in a lateral direction along said edge.

9. A device according to claim 8, wherein the slide rail is pivotally attached to the edge of an ironing board so that it is rotatable between an operative position and a stowed position.

10. A device according to claim 1, wherein an upper opening of the guide tube is level or otherwise extends between 5 and 50 mm above the ironing surface but below the point of attachment of flex to the appliance.

* * * * *